United States Patent [19]

Lagow et al.

[11] 4,113,772

[45] Sep. 12, 1978

[54] METHOD FOR PRODUCING PERFLUOROETHER OLIGOMERS HAVING TERMINAL CARBOXYLIC ACID GROUPS

[76] Inventors: Richard J. Lagow, 21 Magnolia Ave., Manchester, Mass. 00144; Shoji Inoue, 1494, Tsuda-machi, Kodaira, Tokyo 187, Japan

[21] Appl. No.: 597,937

[22] Filed: Jul. 21, 1975

[51] Int. Cl.$^2$ .............................................. C07C 59/22
[52] U.S. Cl. .................................................... 562/583
[58] Field of Search .......................... 260/535 H, 535 P

[56] References Cited

U.S. PATENT DOCUMENTS

| | | | |
|---|---|---|---|
| 3,250,806 | 5/1966 | Fritz | 260/535H |
| 3,250,807 | 5/1966 | Warnell | 260/535 H |

OTHER PUBLICATIONS

Lovelace, A. M. et al., Aliphatic Fluorine Compounds, pp. 20–23.

*Primary Examiner*—Paul J. Killos
*Attorney, Agent, or Firm*—David E. Brook

[57] ABSTRACT

A method is disclosed for producing perfluoroether oligomers having terminal carboxylic acid groups. In this method, a polyether, such as polyethylene oxide, having a molecular weight higher than the product to be produced is fluorinated in a direct fluorination apparatus. The polyether is fragmented during fluorination and significant yields of the desired oligomer are obtained.

8 Claims, No Drawings

METHOD FOR PRODUCING PERFLUOROETHER OLIGOMERS HAVING TERMINAL CARBOXYLIC ACID GROUPS

BACKGROUND OF THE INVENTION

1. Field of the Invention

This invention is in the field of fluorine chemistry and more particularly in the field of direct fluorination.

2. Description of the Prior Art

The class of polymers known as fluoropolymers are known to exhibit outstanding high temperature properties and are also unusually chemically inert. Because of such properties, they have become extremely valuable in applications where severe environmental factors are encountered.

There have been many problems encountered in producing certain fluoropolymers. One problem is the difficulty in carrying out fluorination reactions. Whereas many compositions can be directly chlorinated or brominated, it has been recognized that fluorine is dissimilar to these halogens in regard to direct halogenation. See McBee et al., U.S. Pat. Nos. 2,533,132 and 2,614,129. In fact, even though direct fluorination is a highly desirable process, prior attempts to use direct fluorination have often produced low to mediocre yields. Additionally, the yields are known to decrease as the molecular complexity of reactants becomes greater, therby making direct fluorination of polymers an even more difficult matter. It is stated in one literature article, for example, that the yield of required fluorocarbon decreases as the molecular complexity of a hydrocarbon precurser increases, and it is difficult to fluorinate hydrocarbons above $C_{10}$ without extensive decomposition occurring. See R. E. Banks, "Fluorocarbons and Their Derivatives", Oldbourne Press, London, p. 7 (1964).

It has been theorized that certain perfluoroether oligomers having terminal carboxylic acid or acid fluoride (—COF) functionalities would have outstanding properties for a number of utilities. Perfluorinated polyethylene oxide having more than two or three repeating ethylene oxide units in the polymer chain, for example, would be expected to be extremely stable, chemically inert, have a favorable glass transition temperature, and have lubricating properties. An oligomer such as this, having terminal functional groups, could be used as a comonomer in polymers wherein it was desired to add flexibility and stability.

Much research has been directed to synthesizing perfluorinated polyethylene oxide. One of the methods used so far was the polymerization of tetrafluoroethylene oxide together with various techniques to simultaneously functionalize the terminal groups. These efforts have met without much success, although some species have been prepared having as many as three or four repeating ethylene oxide units. Nevertheless, these materials fall below the degree of polymerization desired for most applications.

SUMMARY OF THE INVENTION

The invention relates to a new method for preparing perfluoroether oligomers having terminal functional groups. Such terminal functional groups comprise carboxylic acid groups (—COOH) or acid fluoride (—COF) groups.

The method described herein comprises the direct fluorination, preferably by La-Mar techniques, of a polyether starting compound having a higher molecular weight than the desired product. The polyether is placed in a reaction chamber, preferably at atmospheric pressure and room temperature, and subjected to a mixture of elemental fluorine gas and an inert gas. Initially, the flow of fluorine is highly diluted by the inert gas, but subsequently the concentration of fluorine is raised. During the direct fluorination, the polyether is fragmented and some of the fragments are simultaneously fluorinated and functionalized in their terminal groups.

The reactions described herein have all of the advantages possessed by the La-Mar direct fluorination techniques. Their most important advantage is their ability to produce significant yields of perfluoroether oligomers having desirable degrees of polymerization and terminal functional groups. Heretofore, such compounds could not be produced by any method.

DESCRIPTION OF PREFERRED EMBODIMENTS

The direct fluorination of polyethers described herein is illustrated with polyethylene oxide as follows:

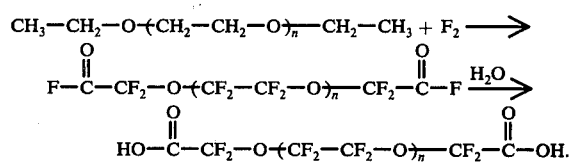

The process is illustrated and described herein in terms of polyethylene oxide, but other polymeric ethers can also be used. For example, other polyalkylene ethers, such as polypropylene oxide and polyisobutylene oxide, could be used as could polyaryl ethers such as polyphenylene oxide. Additionally, polymers containing heterocyclic ether groups could also be used.

The physical form of the starting polyether is not critical. A wide variety of physical forms can be used including powders, films, membranes, frits, pellets, rods, etc. It is preferred, however, to use relatively fine powders to ensure complete reaction.

Fluorine gas is the preferred fluorinating agent and is available commercially at high purity levels. Other sources of fluorine, although not preferred, can be used, including chlorine trifluoride or bromine trifluoride. These latter sources of fluorine do, however, typically result in products which are partially chlorinated or brominated.

Although not required, it is possible to mix a source of oxygen with the fluorine gas. The preferred source of oxygen is oxygen gas, but other oxygen-containing gases could be used as well. The principal advantage of mixing oxygen with the fluorine is that this tends to raise the yield of difunctional ethers in the products. For a more thorough description of the use of mixtures of fluorine and oxygen, see U.S. patent application Ser. No. 531,931, filed Dec. 12, 1974, the teachings of which are incorporated by reference.

Because of the tendency of fluorine to fragment materials, small concentrations of fluorine are introduced initially to the material in the reactor to be fluorinated. One method for delivering these low concentrations is to dilute the fluorine with an inert gas, such as helium or neon. Alternatively, the fluorine can be introduced at very low flow rates until partial fluorination has been achieved, after which the flow rate can be increased. Increasing the fluorine concentration tends to decrease the molecular weight of the products because it causes a more vigorous reaction.

The perfluorination of polyethers described herein can be conveniently carried out at room temperature and atmospheric pressure. These conditions are clearly preferred for solid materials. In any event, the temperature used should not exceed about 300° C. since acid fluoride groups are not stable at such temperatures. Lower temperatures such as −100° C. can be used to obtain higher molecular weight oligomers.

The products of these direct fluorinations contain a significant percentage of difunctional perfluorether oligomers as well as some monofunctional species and some nonfunctional species. Desired products can be separated by liquid chromatography using solvents such as acetone at elevated temperatures such as 200° C. Products containing terminal acid fluoride groups are converted to carboxylic acids by hydrolysis. Exposure to atmospheric conditions is usually sufficient.

For reactions at room temperature and atmospheric pressure, a horizontal cylindrical fluorine reactor can be used. Such a reactor should be fabricated from materials which are inert to fluorine and the various other reactants. A suitable apparatus is described in U.S. patent application Ser. No. 531,931.

The perfluoroether oligomers as described herein are useful as comonomers to add flexibility and stability to various other polymer systems. Additionally, their outstanding stability, chemical inertness and lubrication properties makes them useful as materials themselves such as lubricants and greases, particularly in applications wherein severe environmental conditions are encountered.

EXAMPLE 1

The reactor consisted of a prefluorinated nickel tube 18 inches in length and having an inside diameter of one inch. It contained a prefluorinated nickel reactant vessel 7½ inches long and ½ inch wide. Fluorine gas flow was measured with a Hastings-Raydist model LF-50 mass flowmeter and model F-50M transducer; oxygen and helium flows were measured with simple gas flowmeters. Needle valves were used to control all gas flows, and ¼ inch O.D. copper tubing served as entrance and exit lines to the nickel reactor. An alumina-packed cylinder was used as an unreacted fluorine trap. To eliminate back diffusion of oxygen produced in the alumina trap as well as possible sources of air and moisture, a one inch O.D. by 6 inch tee joint was placed between the reactor and trap. Gases from the reactor were exhausted into the side of the tee joint and a flow of nitrogen (100cc/min), introduced into the top of the tee joint, was used to constantly flush the alumina trap. The bottom of the tee was connected with copper tubing to the alumina trap so that both nitrogen and the waste gases from the reactor were exhausted through the alumina trap. A standard gas bubbler was placed in the line after the alumina trap to prevent air and moisture from entering the alumina trap when the system was not in use. When the system was in use, the nitrogen also exhausted through the bubbler.

Approximately 0.5 grams of polyethylene oxide powder having an average particle size under 150 mesh was placed in the nickel reactant vessel in the tubular reactor. The polyethylene oxide powder used was obtained from Polysciences Inc., grade 4,000,000. The reactor was flushed with helium at 180cc/min. for 1 hour, after which fluorination at room temperature and atmospheric pressure was initiated. The following conditions were used:

| He (cc/min) | $F_2$ (cc/min) | Time (days) |
| --- | --- | --- |
| 40 | 0.5 | 1 |
| 20 | 1 | 1 |
| 10 | 1 | 1 |
| 5 | 1 | 1 |
| 0 | 1 | 1 |

After the fluorination, the resulting products were washed with acetone, filtered and dried. A white powder was obtained with an infrared spectra of fluorinated polyethylene oxide showing a band at 1780 cm$^{-1}$ due to carboxylic acid. The white powder did not melt at temperatures up to 360° C., but sublimed when it was heated at 350°–360° C. for a long period. The product was not soluble in tetrahydrofuran, acetonitrile, carbon tetrachloride, ethyl alcohol, dimethyl sulfoxide, dimethyl formamide, ethyl acetate, nitromethane, pentane or hexafluorobenzene. The IR spectrum of the product during fluorination showed a band at 1880 cm$^{-1}$ which was considered to be an acid fluoride (—COF) band produced by fragmentation of the main polymer chain. As a result, perfluoropolyethylene oxide whose terminal bonds were carboxylic acid was obtained.

The perfluoropolyethylene oxide was titrated with 0.1 normal sodium hydroxide solution and the degree of polymerization was calculated from the results to be 25. An elemental analysis was run on the product and the results were:

|  | C% | F% |
| --- | --- | --- |
| calcd. | 20.86 | 63.12 |
| found | 23.40 | 63.54. |

EXAMPLE 2

The procedure and apparatus of Example 1 were used except that about one gram of polyethylene oxide powder was fluorinated according to the following reaction conditions:

| He (cc/min) | $F_2$ (cc/min) | Time (days) |
| --- | --- | --- |
| 40 | 0.5 | 1 |
| 30 | 1.0 | 1 |
| 20 | 1.0 | 1 |
| 10 | 1.0 | 1 |
| 5 | 1.0 | 1 |
| 0 | 1.0 | 1 |
| 0 | 2.0 | 1 |

The resulting product was washed with acetone containing water and dried under vacuum conditions. The IR spectrum of the product had a band at 1780 cm$^{-1}$, and 6.8 × 10$^{-4}$ moles/gram of carboxylic acid was found in the product. The product did not show a sharp melting point up to 360° C. It is postulated that the fluorinated compound has carboxylic acid groups at both terminal ends, and that the degree of polymerization was 25 units. Analysis found: C, 23.40%; F., 63.54%.

EXAMPLE 3

The procedure and apparatus of Example 1 were used except that about 1.87 grams of polyethylene oxide powder was fluorinated according to the following reaction conditions:

| He (cc/min) | F$_2$ (cc/min) | Time (days) |
|---|---|---|
| 40 | 0.5 | 1 |
| 20 | 1.0 | 1 |
| 10 | 1.0 | 1 |
| 5 | 1.0 | 1 |
| 0 | 1.0 | 1 |
| 0 | 2.0 | 4 |

2.82 grams of fluorinated product were recovered of which 1.36 grams were insoluble in acetone. The acetone insoluble portion had 1.55 × 10$^{-3}$ moles/gram of carboxylic acid groups present. The carboxylic acid groups are postulated to be at terminal portions, and the degree of polymerization is calculated to be 10.

EXAMPLE 4

The procedure and apparatus of Example 1 were used except that 0.87 grams of polyethylene oxide was fluorinated using a mixture of fluorine and oxygen according to the following conditions:

| He (cc/min) | F$_2$ (cc/min) | O$_2$ (cc/min) | Time (days) |
|---|---|---|---|
| 40 | 0.5 | 0.5 | 3 |
| 20 | 1.0 | 1.0 | 4 |
| 10 | 1.0 | 1.0 | 6 |
| 0 | 1.0 | 0 | 5 |
| 0 | 4.0 | 0 | 1 |

Most of the product obtained was soluble in water and acetone, presumably because the molecular weight of the product was low.

EXAMPLE 5

The procedure and apparatus of Example 1 were used except that 0.39 grams of polyethylene oxide were fluorinated according to the following conditions:

| He (cc/min) | F$_2$ (cc/min) | Time (days) |
|---|---|---|
| 40 | 0.5 | 4 |
| 20 | 1.0 | 3 |
| 10 | 1.0 | 4 |
| 5 | 1.0 | 3 |

-continued

| He (cc/min) | F$_2$ (cc/min) | Time (days) |
|---|---|---|
| 0 | 1.0 | 4 |
| 0 | 2.0 | 2 |
| 0 | 4.0 | 1 |
| 0 | 1.0 | 4 |
| 0 | 4.0 | 1. |

0.815 grams of product containing 0.621 grams of acetone insoluble material were obtained. The IR spectrum during the fluorination showed bands at 1880 cm$^{-1}$ and 1846 cm$^{-1}$. After washing with acetone, the IR spectrum exhibited a band at 1780 cm$^{-1}$. 6.23 × 10$^{-4}$ moles/gram of carboxylic acid was found. Analysis found: C, 22.49%; F, 63.48%.

What is claimed is:

1. A process for forming perfluoroether oligomers having terminal carboxylic acid groups comprising:
   a. placing a polyether having a molecular weight higher than the desired oligomer product in an enclosed reactor which is maintained at a temperature below the decomposition point of said polyether; and,
   b. directly fluorinating said polyether by introducing a source of elemental fluorine into said reactor until said perfluorinated polyether having terminal carboxylic acid groups is formed.

2. A process of claim 1 wherein said polyether comprises polyethylene oxide.

3. A process of claim 2 wherein said source of elemental fluorine is fluorine gas.

4. A process of claim 3 wherein said elemental fluorine gas is diluted during said direct fluorination.

5. A process of claim 4 wherein said fluorine gas is diluted with an inert gas.

6. A process of claim 3 wherein oxygen is simultaneously introduced with elemental fluorine during said direct fluorination of said polyether.

7. A perfluorinated polyethylene oxide having a degree of polymerization above 5 and having terminal groups selected from acid fluoride groups and carboxylic acid groups.

8. A perfluorinated polyethylene oxide of claim 7 having a degree of polymerization between about 20 and about 25.

* * * * *